US009670292B2

(12) United States Patent
Kotake et al.

(10) Patent No.: US 9,670,292 B2
(45) Date of Patent: Jun. 6, 2017

(54) APPARATUS FOR PRODUCING WATER-ABSORBENT RESIN (71) Applicant: Sumitomo Seika Chemicals Co., Ltd., Kako-gun, Hyogo (JP)

(72) Inventors: Masato Kotake, Hyogo (JP); Kenji Nakamura, Hyogo (JP); Masahiro Kuzukawa, Hyogo (JP)

(73) Assignee: SUMITOMO SEIKA CHEMICALS CO., LTD., Hyogo (JP)

( * ) Notice: Subject to any disclaimer, the term of this patent is extended or adjusted under 35 U.S.C. 154(b) by 0 days.

(21) Appl. No.: 14/774,542

(22) PCT Filed: Jan. 30, 2014

(86) PCT No.: PCT/JP2014/052156
§ 371 (c)(1),
(2) Date: Sep. 10, 2015

(87) PCT Pub. No.: WO2014/141764
PCT Pub. Date: Sep. 18, 2014

(65) Prior Publication Data
US 2016/0039950 A1    Feb. 11, 2016

(30) Foreign Application Priority Data

Mar. 11, 2013  (JP) ................................ 2013-048441
Aug. 19, 2013  (JP) ................................ 2013-169863

(51) Int. Cl.
*C08F 2/01* (2006.01)
*B01J 19/00* (2006.01)
(Continued)

(52) U.S. Cl.
CPC ............. *C08F 2/01* (2013.01); *B01J 19/0013* (2013.01); *B01J 19/1862* (2013.01); *B01J 19/24* (2013.01);
(Continued)

(58) Field of Classification Search
CPC .................... B01J 19/18; B01J 19/0013; B01J 2219/00103; B01J 2219/0094;
(Continued)

(56) References Cited

U.S. PATENT DOCUMENTS 3,578,649 A * 5/1971 Badguerahanian ..... B01F 7/166
422/135
3,661,815 A    5/1972 Smith
(Continued)

FOREIGN PATENT DOCUMENTS

CN         1408467 A      4/2003
CN       101102836 A      1/2008
(Continued)

OTHER PUBLICATIONS

International Search Report dated Apr. 28, 2014 issued in PCT Patent Application No. PCT/JP2014/052156—English Translation Only.
(Continued)

*Primary Examiner* — Lessanework Seifu
(74) *Attorney, Agent, or Firm* — Harness, Dickey and Pierce, P.L.C.

(57) ABSTRACT

In an apparatus for producing the water-absorbent resin, gas heated by the polymerization heat accompanied by a polymerization reaction in a reactor main body flows through a first pipe into a heat exchanging structure, and a cooled fluid obtained by the cooling flows through a second pipe into the reactor main body. In the apparatus, a first pipe temperature adjusting portion adjusts a temperature of the first pipe to fall within a predetermined temperature range, and a polymerization reactor temperature adjusting portion adjusts a temperature of an upper portion of the reactor main body to fall within a predetermined temperature range.

12 Claims, 2 Drawing Sheets (51) Int. Cl.
*B01J 19/18* (2006.01)
*C08F 2/00* (2006.01)
*B01J 19/24* (2006.01)
*C08F 6/00* (2006.01)

(52) U.S. Cl.
CPC .............. *C08F 2/002* (2013.01); *C08F 6/008* (2013.01); *B01J 2219/00103* (2013.01); *B01J 2219/24* (2013.01)

(58) Field of Classification Search
CPC .... B01J 2219/00105; B01J 2219/00108; B01J 2219/00128; B01J 2219/0013; C08F 2/01
See application file for complete search history.

(56) References Cited

U.S. PATENT DOCUMENTS

| | | | |
|---|---|---|---|
| 3,968,090 | A | 7/1976 | Shimada et al. |
| 4,076,663 | A | 2/1978 | Masuda et al. |
| 4,369,097 | A * | 1/1983 | Nezu ................ B01D 3/00 202/184 |
| 4,446,261 | A | 5/1984 | Yamasaki et al. |
| 6,060,564 | A | 5/2000 | Uchida et al. |
| 6,174,978 | B1 | 1/2001 | Hatsuda et al. |
| 6,194,531 | B1 | 2/2001 | Hatsuda et al. |
| 6,207,772 | B1 | 3/2001 | Hatsuda et al. |
| 6,831,139 | B2 | 12/2004 | Kawahara et al. |
| 2003/0095471 | A1 | 5/2003 | Hamamoto et al. |
| 2004/0236049 | A1 | 11/2004 | Fuchs et al. |
| 2009/0118444 | A1 | 5/2009 | Woike et al. |

FOREIGN PATENT DOCUMENTS

| | | |
|---|---|---|
| EP | 0234202 A1 | 9/1987 |
| JP | 49-43395 | 11/1974 |
| JP | 51-2789 A | 1/1976 |
| JP | 51-125468 | 11/1976 |
| JP | 52-14689 | 2/1977 |
| JP | 57-021405 | 2/1982 |
| JP | 57-158209 | 9/1982 |
| JP | 62-172006 | 7/1987 |
| JP | 04-372603 A | 12/1992 |
| JP | 08-231643 A | 9/1996 |
| JP | 10-67805 A | 3/1998 |
| JP | 11-228604 A | 8/1999 |
| JP | 2001-131210 A | 5/2001 |
| JP | 2002-179706 A | 6/2002 |
| JP | 2002-356517 A | 12/2002 |

OTHER PUBLICATIONS

Chinese Office Action dated Jun. 13, 2016 issued in Chinese Patent Application No. 201480009634.1 (with English concise explanation).
International Preliminary Report on Patentability dated Sep. 24, 2015 issued in PCT Patent Application No. PCT/JP2014/052156—with Full English Translation.
European Search Report Dated Oct. 17, 2016 Issued in European Patent Application No. 14765780.3.
Office Action dated Nov. 21, 2016 Issued in Corresponding Chinese Patent Application No. 201480009634.1.

* cited by examiner

APPARATUS FOR PRODUCING WATER-ABSORBENT RESIN

PRIORITY STATEMENT

This application is a national stage application under 35 U.S.C. §371 of PCT International Application No. PCT/JP2014/052156 which has an International filing date of 30 Jan. 2014, which claims priority under 35 U.S.C. §119 to Japanese Application No. 2013-048441 filed 11 Mar. 2013 and Japanese Application No. 2013-169863 filed 19 Aug. 2013. The contents of each application recited above are incorporated herein by reference in their entirety.

TECHNICAL FIELD

The invention relates to an apparatus for producing a water-absorbent resin by polymerizing a water soluble ethylenically unsaturated monomer.

BACKGROUND ART

The water-absorbent resin is widely used for sanitary materials such as paper diapers and sanitary goods, commodities such as pet sheets, industrial materials such as water-absorbent sheets for food, water stop materials for cables, and dew condensation preventing materials, water retention agents for greening, agriculture, and gardening, and a soil conditioner. The water-absorbent resin is particularly used for sanitary materials, among the uses described above.

Generally, such a water-absorbent resin is a slightly crosslinked polymer. As the water-absorbent resin, for example, a starch-based water-absorbent resin such as a hydrolysate of a starch-acrylonitrile graft copolymer (see Patent Literature 1), and a neutralized product of a starch-acrylic acid graft copolymer (see Patent Literature 2), a saponified product of a vinyl acetate-acrylic acid ester copolymer (see Patent Literature 3), and a partially neutralized product of polyacrylic acid (see Patent Literatures 4, 5, and 6) are known.

The water-absorbent resin can be produced by polymerizing a water soluble ethylenically unsaturated monomer in an aqueous liquid medium (liquid medium containing water), but since polymerization heat is generated during polymerization reaction, the polymerization heat has to be removed. As the method of removing the polymerization heat, a method of providing a jacket or a coil through which a cooling medium such as water flows, outside or inside of a polymerization reactor in which a polymerization reaction is performed in a water soluble ethylenically unsaturated monomer, a method of connecting a cooler such as a heat exchanging structure (reflux condenser) to the polymerization reactor (see Patent Literature 7), and a method for using evaporation latent heat of polymerization liquid are used.

CITATION LIST

Patent Literature

Patent Literature 1: Japanese Examined Patent Publication JP-B 49-43395 (1974)
Patent Literature 2: Japanese Unexamined Patent Publication JP-A 51-125468 (1976)
Patent Literature 3: Japanese Unexamined Patent Publication JP-A 52-14689 (1977)
Patent Literature 4: Japanese Unexamined Patent Publication JP-A 62-172006 (1987)
Patent Literature 5: Japanese Unexamined Patent Publication JP-A 57-158209 (1982)
Patent Literature 6: Japanese Unexamined Patent Publication JP-A 57-21405 (1982)
Patent Literature 7: Japanese Unexamined Patent Publication JP-A 4-372603 (1992)

SUMMARY OF INVENTION

Technical Problem

When the water-absorbent resin is produced by a polymerization reaction, even if any of the polymerization heat removing methods is adopted, the gelation of polymerization liquid (liquid medium containing water-absorbent resin) or deposition of a polymer is generated due to the removal of the polymerization heat.

Particularly, in a method of connecting a cooler such as a heat exchanging structure to a polymerization reactor, the precipitation of a polymer in a portion coming into contact with gas in the polymerization reactor causes great troubles. The cooler such as a heat exchanging structure cools the gas by heat exchange between a heat exchange fluid and gas heated in the polymerization reactor and causes the cooled gas to flow into the polymerization reactor. In a case where the polymerization heat is removed by the cooler, a polymer resulted from condensation of gas as well as a solidified polymer is adhered to the inner wall surface of a pipe which is connected between the polymerization reactor and the cooler and through which gas flows, and the adhered product becomes a core that grows into a lump.

When the lump is adhered to the inner wall surface of the pipe, the pipe becomes blocked. In addition, when at least a portion of the lump adhered to the inner wall surface of the pipe is separated, the separated fragments of the lump may flow into the polymerization reactor via the pipe together with the gas. As a result, a problem of decreasing homogeneity of the water-absorbent resin created by the polymerization reaction in the polymerization reactor is generated.

An object of the invention is to provide an apparatus for producing a water-absorbent resin, including a polymerization reactor and a cooler which removes polymerization heat generated during a polymerization reaction in the polymerization reactor, in which the apparatus for producing a water-absorbent resin can suppress adhesion of the polymer to the inner wall surface of a pipe or the like which comes into contact with gas discharged from the polymerization reactor.

Solution to Problem

The invention provides an apparatus for producing a water-absorbent resin, including:
  a polymerization reactor in which a water-absorbent resin is produced by polymerization reaction on a water soluble ethylenically unsaturated monomer in a liquid medium, the polymerization reactor including
    a reactor main body in which the water soluble ethylenically unsaturated monomer and the liquid medium is contained and an upper portion of which is left for a gaseous phase portion, and
    a gas discharging portion which is connected to the reactor main body and discharges gas of the gaseous phase portion from the reactor main body;

a first channel portion having a first channel which is connected to the gas discharging portion and through which the gas discharged from the reactor main body by the gas discharging portion flows;

a first channel portion temperature adjusting portion which adjusts a temperature of the first channel portion to fall within a predetermined temperature range in which the gas flowing through the first channel of the first channel portion is not condensed;

a cooler which cools the gas, the cooler including a cooler main body which is connected to the first channel portion, into which the gas flowing through the first channel of the first channel portion flows, and which cools inflow gas, and a cooled fluid discharging portion which is connected to the cooler main body and discharges a cooled fluid obtained by cooling the inflow gas in the cooler main body, from the cooler main body; and a second channel portion which is connected to the cooled fluid discharging portion and has a second channel through which the cooled fluid discharged from the cooler main body by the cooled fluid discharging portion flows toward the reactor main body.

Furthermore, in the invention it is preferable that the apparatus for producing a water-absorbent resin further includes a polymerization reactor temperature adjusting portion which adjusts a temperature of the reactor main body to fall within a predetermined temperature range in which the gas is not condensed.

Furthermore, in the apparatus for producing a water-absorbent resin of the invention it is preferable that a temperature range of the first channel portion adjusted by the first channel portion temperature adjusting portion and a temperature range of the reactor main body adjusted by the polymerization reactor temperature adjusting portion are no less than 30° C. and no more than 150° C.

Furthermore, in the invention it is preferable that the apparatus for producing a water-absorbent resin a temperature range of the first channel portion adjusted by the first channel portion temperature adjusting portion and a temperature range of the reactor main body adjusted by the polymerization reactor temperature adjusting portion fall within a range of (T−20)[° C.] to T[° C.], in which a temperature of the gas of the gaseous phase portion in the reactor main body is T[° C.].

Advantageous Effects of Invention

According to the invention, an apparatus for producing a water-absorbent resin includes a polymerization reactor, a first channel portion, a first channel portion temperature adjusting portion, a cooler, and a second channel portion. In the polymerization reactor a water-absorbent resin is produced by polymerization reaction on a water soluble ethylenically unsaturated monomer in a liquid medium, and the polymerization reactor includes a reactor main body and a gas discharging portion. A water soluble ethylenically unsaturated monomer and a liquid medium are contained in the reactor main body, the upper portion of which is left for a gaseous phase portion. The gas discharging portion discharges gas that exists in the gaseous phase portion of the reactor main body, from the reactor main body.

The first channel portion has a first channel through which the gas discharged from the reactor main body by the gas discharging portion flows. The first channel portion temperature adjusting portion adjusts a temperature of the first channel portion to fall within a predetermined temperature range in which the gas flowing through the first channel is not condensed.

A cooler which cools the gas includes a cooler main body and a cooled fluid discharging portion. The gas flowing through the first channel flows into the cooler main body, and the cooler main body cools inflow gas. The cooled fluid discharging portion discharges a cooled fluid obtained by cooling the inflow gas in the cooler main body, from the cooler main body. In addition, the cooled fluid includes liquid resulted from cooling and condensation of gas which has flowed into the cooler main body, and cooled gas.

The second channel portion has a second channel through which the cooled fluid discharged from the cooler main body by the cooled fluid discharging portion flows toward the reactor main body.

In the apparatus for producing the water-absorbent resin according to the invention, which is configured as described above, the gas heated by the polymerization heat accompanied by a polymerization reaction in the reactor main body flows through the first channel of the first channel portion into the cooler main body to be cooled, and the cooled fluid obtained by the cooling flows through the second channel of the second channel portion into the reactor main body. Accordingly, the polymerization heat can be removed in the reactor main body, and stabilization of the polymerization reaction in the reactor main body can be achieved.

Further, in the apparatus for producing a water-absorbent resin according to the invention, since the first channel portion temperature adjusting portion adjusts the temperature of the first channel portion to fall within the predetermined temperature range in which gas flowing through the first channel is not condensed, it is possible to suppress the adhesion of the polymer (a polymer resulted from condensation of gas as well as a solidified polymer) to the inner wall surface of the first channel portion which comes into contact with the gas discharged from the reactor main body and forms the first channel. As a result, in the first channel portion, it is possible to prevent the blocking of the first channel through which the gas flows. In addition, since it is possible to suppress the adhesion of the polymer to the inner wall surface of the first channel portion, it is possible to prevent fragments of the adhered product from flowing into the reactor main body via the first channel portion, the cooler, and the second channel portion together with the gas. As a result, it is possible to prevent the decrease of the homogeneity of the water-absorbent resin created by the polymerization reaction in the reactor main body.

BRIEF DESCRIPTION OF DRAWINGS

Other and further objects, features, and advantages of the invention will be more explicit from the following detailed description taken with reference to the drawings wherein.

DESCRIPTION OF EMBODIMENTS

Hereinafter, preferred embodiments of the invention are described in detail with reference to the drawings.

Figure 1:
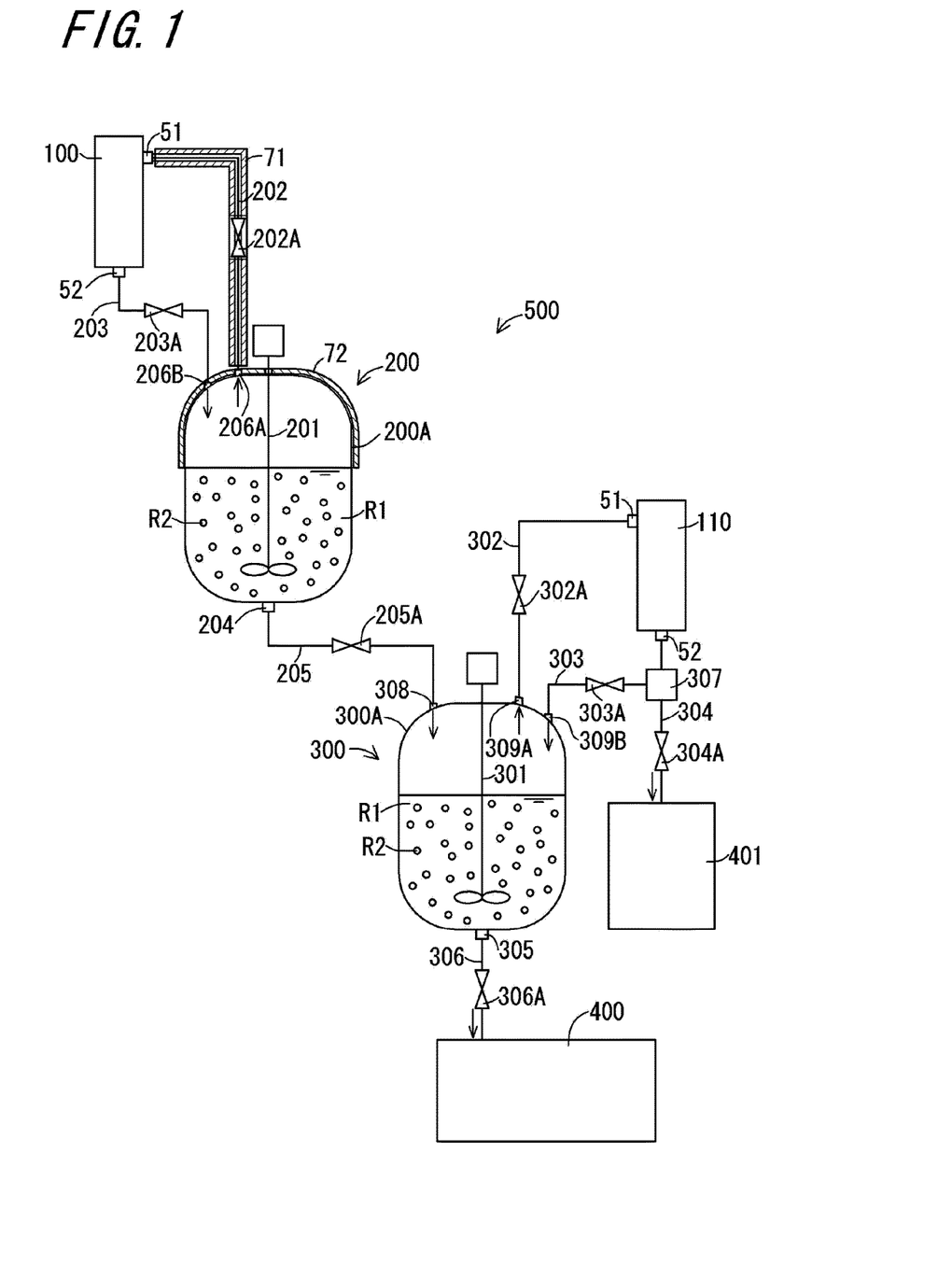
FIG. 1 is a diagram illustrating a configuration of a water-absorbent resin production apparatus 500 according to an embodiment of the invention.

FIG. 1 is a diagram illustrating a configuration of a water-absorbent resin production apparatus 500 according to an embodiment of the invention. The water-absorbent resin can be produced by performing a polymerization reaction on a water soluble ethylenically unsaturated monomer. A method of polymerizing the water soluble ethylenically unsaturated monomer is not particularly limited, and an aqueous solution polymerization method, an emulsification polymerization method, and an inversion phase suspension polymerization method which are representative polymerization methods are used.

In the aqueous solution polymerization method, for example, an aqueous solution of the water soluble ethylenically unsaturated monomer, an internal crosslinking agent, and a water soluble radical polymerization initiator are heated, if necessary, under stirring, so as to perform polymerization. In the aqueous solution polymerization method, water is dealt as a liquid medium, and a polymerization reaction is performed by using the water soluble ethylenically unsaturated monomer in an aqueous solution state.

In addition, in the inversion phase suspension polymerization method, for example, an aqueous solution of the water soluble ethylenically unsaturated monomer, a surfactant, a hydrophobic polymeric dispersant, a water soluble radical polymerization initiator, and an internal crosslinking agent are heated under stirring, in a petroleum-based hydrocarbon dispersion medium so as to perform polymerization. In the inversion phase suspension polymerization method, water and a petroleum-based hydrocarbon dispersion medium are dealt as liquid mediums, and the aqueous solution of the water soluble ethylenically unsaturated monomer is added to the petroleum-based hydrocarbon dispersion medium, so as to perform a polymerization reaction.

In the embodiment, from the point of view that accurate polymerization reaction control and wide particle diameter control are possible, the inversion phase suspension polymerization method is preferable. Hereinafter, as an example of the embodiment of the invention, the production apparatus 500 that produces the water-absorbent resin by the inversion phase suspension polymerization method is described.

The water-absorbent resin production apparatus 500 includes a heat exchanging structure 100 functioning as a cooler, a polymerization reactor 200, a concentrator 300, and a drying machine 400.

The polymerization reactor 200 creates a water-absorbent resin by performing a polymerization reaction on the water soluble ethylenically unsaturated monomer in the liquid medium, and has a reactor main body 200A which is formed in a container shape. In the reactor main body 200A, the water soluble ethylenically unsaturated monomer and the liquid medium are contained and an upper portion of the reactor main body 200A is left for a gaseous phase portion (such that gaseous phase portion is formed in the upper portion), and a polymerization reaction is performed in the reactor main body 200A. Also, in the reactor main body 200A, a gas discharge opening portion 206A functioning as the gas discharging portion, and a cooled fluid inflow opening portion 206B are provided on the upper portion, and a polymerization reaction liquid discharge opening portion 204 are provided on the bottom portion.

The details are described below, but in the polymerization reactor 200, the gas which is heated by the polymerization heat accompanied by the polymerization reaction in the reactor main body 200A and which exists in the gaseous phase portion flowing through a first pipe 202 discharged from the reactor main body 200A via the gas discharge opening portion 206A, flows into the heat exchanging structure 100 via the first pipe 202, and is cooled. The cooled fluid obtained by cooling in the heat exchanging structure 100 flows through a second pipe 203, into the reactor main body 200A via the cooled fluid inflow opening portion 206B. Accordingly, the polymerization heat in the reactor main body 200A can be removed. In addition, a polymerization reaction liquid R1 obtained by the polymerization reaction in the reactor main body 200A is discharged from the reactor main body 200A via the polymerization reaction liquid discharge opening portion 204.

As a material constituting the polymerization reactor 200, copper, a titan alloy, and stainless steel such as SUS304, SUS316 and SUS316L are included. From the point of view that the adhesion of the created water-absorbent resin is suppressed, surface processing such as fluororesin processing is preferably performed on the inner wall surface.

As the water soluble ethylenically unsaturated monomer used in a raw material of the water-absorbent resin, for example, there are included a monomer having an acid group such as (meth)acrylic acid ("(meth)acryl" means "acryl" and "methacryl", which is the same, hereinafter), 2-(meth)acrylamide-2-methylpropane sulfonic acid or maleic acid, and salts thereof; a nonionic unsaturated monomer such as (meth)acrylamide, N,N-dimethyl(meth)acrylamide, 2-hydroxyethyl(meth)acrylate and N-methylol (meth)acrylamide; an amino group-containing unsaturated monomer such as diethylaminoethyl(meth)acrylate and diethylaminopropyl(meth)acrylate, and quaternized products thereof. These may be used alone, or two or more thereof may be used in combination.

In addition, as an alkaline compound which is used when a monomer having an acid group is neutralized to a salt, compounds of lithium, sodium, potassium, ammonium or the like are included. More specifically, sodium hydroxide, potassium hydroxide, lithium hydroxide, sodium carbonate or ammonium carbonate are included.

Among the water soluble ethylenically unsaturated monomers, from the point of view of easy availability on an industrial scale, (meth)acrylic acid and salts thereof are preferabe.

In addition, in a case where a monomer having an acid group is neutralized, the neutralization degree is preferably in the range of 30 to 90% by mol of the acid group in the water soluble ethylenically unsaturated monomer. When the neutralization degree is 30% by mol or greater, the acid group is easily ionized and the decrease of water absorption properties can be suppressed. When the neutralization degree is 90% by mol or lower, safety problems can be suppressed in case of being used as sanitary materials.

In the embodiment, the water soluble ethylenically unsaturated monomer is used as the aqueous solution. The monomer concentration of the aqueous solution of the water soluble ethylenically unsaturated monomer is preferably in the range between 20% by mass and saturated concentration.

In the aqueous solution of the water soluble ethylenically unsaturated monomer, a chain transfer agent, and a thickener may be included, if necessary. As the chain transfer agent, for example, compounds such as thiols, thiol acids, secondary alcohols, hypophosphorous acid and phosphorous acid are included. These may be used alone, or two or more thereof may be used in combination. As the thickener, there are included carboxymethyl cellulose, hydroxyethyl cellulose, hydroxypropyl cellulose, methyl cellulose, polyethylene glycol, polyacrylic acid, polyacrylic acid neutralized product, and polyacrylamide.

As the petroleum-based hydrocarbon dispersion medium, for example, there are included aliphatic hydrocarbons having 6 to 8 carbon atoms such as n-hexane, n-heptane, 2-methyl hexane, 3-methyl hexane, 2,3-dimethyl pentane, 3-ethyl pentane and n-octane; alicyclic hydrocarbon such as cyclohexane, methylcyclohexane, cyclopentane, methyl cyclopentane, trans-1,2-dimethyl-cyclopentane, cis-1,3-dimethyl-cyclopentane and trans-1,3-dimethyl-cyclopentane; and aromatic hydrocarbons such as benzene, toluene and xylene. Among them, from the point of view of easy availability on an industrial scale and safety, aliphatic hydrocarbons having 6 to 8 carbon atoms such as n-hexane, n-heptane, 2-methyl hexane, 3-methyl hexane and n-octane; and alicyclic hydrocarbons having 6 to 8 carbon atoms such as cyclohexane, methylcyclopentane and methylcyclohexane are preferably used. The petroleum-based hydrocarbon dispersion media may be used alone, or two or more thereof may be used in combination.

Further, among the petroleum-based hydrocarbon dispersion media, from the point of view of a satisfactory inversion phase suspension state, easy obtainability of appropriate particle diameters, easy availability on an industrial scale, and stable quality, n-heptane and cyclohexane are preferably used. In addition, as an example of a mixture of the hydrocarbon described above, Exxsol Heptane (manufactured by Exxon Mobil Corporation: 75% to 85% of hydrocarbon of n-heptane and an isomer is contained) which is commercially available, or the like may be used so as to obtain very preferable results.

Generally, in order to evenly disperse the aqueous solution of the water soluble ethylenically unsaturated monomer and easily control the polymerization temperature, the used amount of the petroleum-based hydrocarbon dispersion medium is preferably in the range of 50 to 600 parts by mass, more preferably in the range of 50 to 400 parts by mass, and particularly more preferably in the range of 50 to 200 parts by mass with respect to 100 parts by mass of the aqueous solution of the water soluble ethylenically unsaturated monomer.

In the inversion phase suspension polymerization, the aqueous solution of the water soluble ethylenically unsaturated monomer is dispersed in the petroleum-based hydrocarbon dispersion medium, and a surfactant and, if necessary, a hydrophobic polymeric dispersant are used in order to obtain more stable polymerization particles. From the point of view of properly and stably completing the polymerization, a timing of adding the surfactant or the hydrophobic polymeric dispersant is not particularly limited, as long as the polymerization can be performed after the aqueous solution of the water soluble ethylenically unsaturated monomer is caused to exist before the polymerization, the aqueous solution of the water soluble ethylenically unsaturated monomer is sufficiently dispersed in the petroleum-based hydrocarbon dispersion medium, and liquid droplets thereof are stabilized. In view of the existing techniques, though there are a few exceptions, the surfactant or the hydrophobic polymeric dispersant are generally dissolved or dispersed in the petroleum-based hydrocarbon dispersion medium, in advance, before the aqueous solution of the water soluble ethylenically unsaturated monomer is added.

As the surfactant used for maintaining dispersion stability at the time of polymerization, for example, there are included nonionic surfactants such as sorbitan fatty acid ester, polyoxyethylene sorbitan fatty acid ester, polyglyceryl fatty acid ester, polyoxyethylene glycerly fatty acid ester, sucrose fatty acid ester, sorbitol fatty acid ester, polyoxyethylene sorbitol fatty acid ester, polyoxyethylene alkyl ether, polyoxyethylene alkyl phenyl ether, polyoxyethylene castor oil, polyoxyethylene hydrogenated castor oil, alkyl allyl formaldehyde condensed polyoxyethylene ether, polyoxyethylene polyoxypropyl alkyl ether, polyethylene glycol fatty acid esters, alkyl glucoside, N-alkyl gluconamide, polyoxyethylene fatty acid amide and polyoxyethylene alkylamine; and anionic surfactants such as fatty acid salt, alkyl benzene sulfonic acid salt, alkyl methyl taurine acid salt, polyoxyethylene alkyl phenyl ether sulfuric acid ester salt, polyoxyethylene alkyl ether sulfuric acid ester salt, polyoxyethylene alkyl ether sulfonic acid and salts thereof, polyoxyethylene alkyl phenyl ether phosphoric acid and salts thereof and polyoxyethylene alkyl ether phosphate and salts thereof. These may be used alone or two or more thereof may be used in combination.

Among the surfactants, from the point of view of dispersion stability of the aqueous solution of the monomer, at least one selected from the group consisting of polyglyceryl fatty acid ester, sucrose fatty acid ester, and sorbitan fatty acid ester is preferable.

The added amount of the used surfactant is preferably in the range of 0.01 to 5 parts by mass, and is more preferably in the range of 0.05 to 3 parts by mass with respect to 100 parts by mass of the aqueous solution of the water soluble ethylenically unsaturated monomer. When the added amount of the surfactant is 0.01 part by mass or greater, the dispersion stability of the aqueous solution of the water soluble ethylenically unsaturated monomer can be inhibited from decreasing, and when the added amount of the surfactant is 5 parts by mass or lower, an economic advantage can be obtained.

In order to increase the dispersion stability at the time of polymerization, the hydrophobic polymeric dispersant and the surfactant may be used in combination. As the hydrophobic polymeric dispersant, products which are dissolved or dispersed in the used petroleum-based hydrocarbon dispersion medium are preferably selected and used. For example, products having a viscosity average molecular weight of 20000 or lower, preferably in the range of 10000 or lower, and more preferably in the range of 5000 or lower are usable. Specifically, maleic anhydride-modified polyethylene, maleic anhydride-modified polypropylene, a maleic anhydride-modified ethylene-propylene copolymer, a maleic anhydride-ethylene copolymer, a maleic anhydride-propylene copolymer, a maleic anhydride-ethylene-propylene copolymer, polyethylene, polypropylene, an ethylene-propylene copolymer, oxidized polyethylene, oxidized polypropylene, an oxidized ethylene-propylene copolymer, an ethylene-acrylic acid copolymer, ethyl cellulose, maleic anhydride polybutadiene, and maleic anhydride EPDM (ethylene/propylene/diene terpolymer) are usable.

Among these, at least one selected from the group consisting of maleic anhydride-modified polyethylene, maleic anhydride-modified polypropylene, a maleic anhydride-modified ethylene-propylene copolymer, a maleic anhydride-ethylene copolymer, a maleic anhydride-propylene copolymer, a maleic anhydride-ethylene-propylene copolymer, polyethylene, polypropylene, an ethylene-propylene copolymer, oxidized polyethylene, oxidized polypropylene, and an oxidized ethylene-propylene copolymer is preferable.

The added amount of the hydrophobic polymeric dispersant is preferably in the range of 0 to 5 parts by mass, more preferably in the range of 0.01 to 3 parts by mass, and particularly more preferably in the range of 0.05 to 2 parts by mass with respect to 100 parts by mass of the aqueous solution of the water soluble ethylenically unsaturated monomer. When the added amount of the hydrophobic polymeric dispersant is 5 parts by mass or lower, an economic advantage can be obtained.

When the aqueous solution of the water soluble ethylenically unsaturated monomer is added and dispersed in the petroleum-based hydrocarbon dispersion medium included in the polymerization reactor 200 in advance, the aqueous solution is dispersed by a stirring portion 201. However, the stirring condition by the stirring portion 201 varies according to a desired dispersed liquid droplet diameter, and thus may not be simply determined. The desired dispersed liquid droplet diameter may be adjusted according to the kind of stirring blades, a blade diameter, and a rotation number of the stirring portion 201. As the stirring blades, for example, a propeller blade, a paddle blade, an anchor blade, a turbine blade, a Pfaudler blade, a ribbon blade, a FULLZONE blade (manufactured by Shinko Pantec Kabushiki Kaisha), a MAXBLEND blade (manufactured by Sumitomo Heavy Industries, Ltd.), and SUPER-MIX (manufactured by Satake Chemical Equipment Mfg., Ltd.) can be used.

In the reactor main body 200A of the polymerization reactor 200, the aqueous solution of the water soluble ethylenically unsaturated monomer which is added to the petroleum-based hydrocarbon dispersion medium at a predetermined addition rate is sufficiently stirred and dispersed in the petroleum-based hydrocarbon dispersion medium in the presence of a surfactant by using the stirring portion 201, so as to stabilize the liquid droplets. Also, after sufficient nitrogen substitution is performed in the reactor main body 200A, inversion phase suspension polymerization is performed with a water soluble radical polymerization initiator in the presence of the internal crosslinking agent, if necessary, so as to obtain a suspension of a water-containing gel crosslinked polymer.

As the water soluble radical polymerization initiator used in the embodiment, for example, there are included persulfate such as potassium persulfate, ammonium persulfate and sodium persulfate; peroxides such as hydrogen peroxide; azo compounds such as 2,2'-azobis(2-amidinopropane)dihydrochloride, 2,2'-azobis[N-(2-carboxyethyl)-2-methyl-propiondiamine]tetrahydrate, 2,2'-azobis(1-imino-1-pyrrolidino-2-methylpropane)dihydrochloride, and 2,2'-azobis[2-methyl-N-(2-hydroxyethyl)-propionamide].

Among these, from the point of view of easy availability and easy handling, potassium persulfate, ammonium persulfate, sodium persulfate, and 2,2'-azobis(2-amidinopropane) dihydrochloride are preferable.

In addition, the water soluble radical polymerization initiator may be used as a redox polymerization initiator together with reductants such as sulfite and ascorbic acid.

Generally, the used amount of the water soluble radical polymerization initiator is in the range of 0.01 to 1 part by mass with respect to 100 parts by mass of the water soluble ethylenically unsaturated monomer. When the used amount is 0.01 part by mass or greater, the polymerization rate can be inhibited from decreasing, and when the used amount is 1 part by mass or lower, drastic polymerization reaction can be suppressed.

The addition time of the water soluble radical polymerization initiator is not particularly limited, but the water soluble radical polymerization initiator is preferably added to the aqueous solution of the water soluble ethylenically unsaturated monomer, in advance.

As the internal crosslinking agent used as necessary, for example, there are included (poly)ethylene glycol (the expression "(poly)" means the case where the prefix "poly" is included and the case where the prefix "poly" is not included, which are the same, hereinafter), polyols such as 1,4-butanediol, glycerol and trimethylolpropane, polyunsaturated esters having two or more vinyl groups obtained by reacting polyols with unsaturated acids such as acrylic acid and methacrylic acid, bisacrylamides such as N,N'-methylenebisacrylamide and polyglycidyl compounds containing two or more glycidyl groups such as (poly)ethylene glycol diglycidyl ether, (poly)ethylene glycol triglycidyl ether, (poly)glycerine diglycidyl ether, (poly)glycerin triglycidyl ether, (poly)propylene glycol polyglycidyl ether and (poly)glycerol polyglycidyl ether. These may be used alone, or two or more thereof may be used in combination.

The added amount of the internal crosslinking agent is preferably in the range of 0 to 3 parts by mass, more preferably in the range of 0 to 1 part by mass, and particularly more preferably in the range of 0.001 to 0.1 part by mass with respect to 100 parts by mass of the water soluble ethylenically unsaturated monomer. When the added amount is 3 parts by mass or lower, excessive crosslinking is suppressed and water absorption properties are inhibited from becoming too low. The internal crosslinking agent is preferably added to the aqueous solution of the water soluble ethylenically unsaturated monomer, in advance.

The reaction temperature when the inversion phase suspension polymerization is performed in the reactor main body 200A of the polymerization reactor 200 varies depending on the kinds and the amounts of used polymerization initiator, and thus may not be simply determined. The reaction temperature is preferably in the range of 30 to 100° C., and more preferably in the range of 40 to 90° C. When the reaction temperature is 30° C. or greater, the polymerization rate can be inhibited from decreasing, and when the reaction temperature is 100° C. or lower, the drastic polymerization reaction can be suppressed.

A multistage polymerization of polymerizing the above-obtained polymerization reaction liquid R1 (suspension of the water-containing gel crosslinked polymer R2) which contains a water-containing gel crosslinked polymer R2 on a first stage, and repeating polymerization while adding the aqueous solution of the water soluble ethylenically unsaturated monomer several times may be performed. Particularly, in the use for sanitary material application, from the point of view of sizes of the obtained water-absorbent resin particles and productivity, two-stage polymerization is preferably performed.

With respect to the size of the particles that can be obtained by the polymerization of the water soluble ethylenically unsaturated monomer on the first stage, in view of obtaining an appropriate aggregated particle diameter in the multistage polymerization, the medium particle diameter is preferably in the range of 20 to 200 μm, more preferably in the range of 30 to 150 μm, and still preferably in the range of 40 to 100 μm. In addition, the medium particle diameter of the polymerization particle on the first stage may be measured by dehydration and drying, after the polymerization on the first stage ends.

In a case where the two stage polymerization is performed, the water-absorbent resin that is appropriate for sanitary materials and has a relatively large average diameter can be obtained by aggregating particles obtained by the polymerization on the first stage according to the method described below.

At this time, actions of the surfactant are required to be decreased such that the aqueous solution of the water soluble ethylenically unsaturated monomer used in the polymerization on the second stage does not form separate liquid droplets. For example, the aggregated particles may be obtained by performing cooling after the polymerization on the first stage and adding the aqueous solution of the water soluble ethylenically unsaturated monomer of the polymerization on the second stage at a temperature in which at least a portion of the surfactant is deposited.

In addition, the method of obtaining aggregated particles is not limited to the above method, as long as the method is a method of obtaining aggregated particles by adding the aqueous solution of the water soluble ethylenically unsaturated monomer of the polymerization on the second stage.

In addition, the residual amount of the petroleum-based hydrocarbon dispersion medium in the water-absorbent resin can be further decreased by adding the aqueous solution of the water soluble ethylenically unsaturated monomer of the polymerization on the second stage after the surface active action of the surfactant as described above is decreased.

As the water soluble ethylenically unsaturated monomer of the polymerization on the second stage, the same products described as the water soluble ethylenically unsaturated monomer of the polymerization on the first stage may be used, but the kinds of the monomer, neutralization degrees, and neutralizing salts, and the concentration of the aqueous solution of the monomer may be identical to or different from those of the water soluble ethylenically unsaturated monomer of the polymerization on the first stage.

The polymerization initiator to be added to the aqueous solution of the water soluble ethylenically unsaturated monomer of the polymerization on the second stage may also be selected from the products exemplified for the water soluble ethylenically unsaturated monomer of the polymerization on the first stage, and used.

In addition, the internal crosslinking agent and the chain transfer agent may be added to the aqueous solution of the water soluble ethylenically unsaturated monomer of the polymerization on the second stage, if necessary, and the internal crosslinking agent and the chain transfer agent may also be selected from the products exemplified for the water soluble ethylenically unsaturated monomer of the polymerization on the first stage, and used.

From the point of view of obtaining appropriate aggregated particles, the added amount of the water soluble ethylenically unsaturated monomer of the polymerization on the second stage with respect to 100 parts by mass of the water soluble ethylenically unsaturated monomer of the polymerization on the first stage is preferably in the range of 50 to 300 parts by mass, more preferably in the range of 100 to 200 parts by mass, and particularly more preferably in the range of 120 to 160 parts by mass.

In the inversion phase suspension polymerization on the second stage, the stirring by the stirring portion 201 may be performed such that the entirety of components are evenly mixed. The aggregated particle diameter may be changed according to the amount of the water soluble ethylenically unsaturated monomer of the polymerization on the second stage with respect to the water soluble ethylenically unsaturated monomer of the polymerization on the first stage or the deposition state of the surfactant. In addition, the aggregated particle diameter of the water-absorbent resin appropriate for the sanitary materials is preferably in the range of 200 to 600 µm, more preferably in the range of 250 to 500 µm, and particularly more preferably in the range of 300 to 450 µm.

The reaction temperature in the inversion phase suspension polymerization on the second stage varies depending on the kinds and the amounts of the polymerization initiator, and thus may not be simply determined. However, the reaction temperature is preferably in the range of 30 to 100° C., and more preferably in the range of 40 to 90° C. When the multistage polymerization having two stages or more is performed, the following polymerization on the second stage may be further performed by renaming them as third and fourth stages.

The heat exchanging structure 100 is connected to the water-absorbent resin production apparatus 500 according to the embodiment, in the reactor main body 200A of the polymerization reactor 200 via the first pipe 202 functioning as the first channel portion. The first pipe 202 is connected to the gas discharge opening portion 206A provided on the upper portion of the reactor main body 200A such that one end portion communicates with the gaseous phase portion of the reactor main body 200A and the other end portion is connected to a gas inflow opening portion 51 of the heat exchanging structure 100. In addition, a first valve 202A that opens and closes the channel in the pipe is provided in the first pipe 202. When the first valve 202A is in an open state, the gas existing in the gaseous phase portion of the reactor main body 200A is discharged from the reactor main body 200A via the gas discharge opening portion 206A and flows through the first pipe 202 into the heat exchanging structure 100 via the gas inflow opening portion 51.

The heat exchanging structure 100 cools the gas by the heat exchange between the gas heated in the reactor main body 200A and the heat exchange fluid, and discharges the cooled fluid obtained by the cooling to the outside via a cooled fluid discharge opening portion 52 functioning as the cooled fluid discharging portion. In addition, the liquid obtained by cooling and condensing (liquefying) the gas flowing from the reactor main body 200A into the heat exchanging structure 100 and the cooled gas are contained in the cooled fluid discharged via the cooled fluid discharge opening portion 52.

The second pipe 203 functioning as the second channel portion is connected between the cooled fluid discharge opening portion 52 and the cooled fluid inflow opening portion 206B of the reactor main body 200A. A second valve 203A that opens and closes the channel in the pipe is provided in the second pipe 203. When the second valve 203A is in an open state, the cooled fluid in the heat exchanging structure 100 is discharged from the heat exchanging structure 100 via the cooled fluid discharge opening portion 52, flowing through the second pipe 203 into the reactor main body 200A via the cooled fluid inflow opening portion 206B. In addition, details of the configuration of the heat exchanging structure 100 are described below.

The water-absorbent resin production apparatus 500 cools the gas by heat exchange between the gas heated in the reactor main body 200A and the heat exchange fluid in the heat exchanging structure 100, and the cooled fluid obtained by the cooling flows into the reactor main body 200A via the second pipe 203. Therefore, the polymerization heat in the reactor main body 200A can be removed, and thus the stabilization of the polymerization reaction of the water soluble ethylenically unsaturated monomer can be achieved.

On the bottom portion of the reactor main body 200A, there is provided the polymerization reaction liquid discharge opening portion 204 that discharges the polymerization reaction liquid R1 containing the water-containing gel crosslinked polymer R2 from the reactor main body 200A after the polymerization reaction. The polymerization reaction liquid R1 discharged from the reactor main body 200A via the polymerization reaction liquid discharge opening portion 204 flows into the concentrator 300.

As a characteristic configuration, the water-absorbent resin production apparatus 500 according to the embodiment includes a first pipe temperature adjusting portion 71 functioning as a first channel portion temperature adjusting portion, and a polymerization reactor temperature adjusting portion 72.

The first pipe temperature adjusting portion 71 adjusts the temperature of the first pipe 202 to fall within a predetermined temperature range (hereinafter, "predetermined temperature range") such that the gas flowing through the first pipe 202 is not condensed. The first pipe temperature adjusting portion 71 adjusts the temperature of the first pipe 202 to fall within the predetermined temperature range by heating the first pipe 202 from the outside or keeping the heat of the first pipe 202.

In the embodiment, the expression "heating" refers to actively giving heat. Therefore, as a method of adjusting the temperature of the first pipe 202 to fall within the predetermined temperature range by the first pipe temperature adjusting portion 71 heating the first pipe 202, (1) a method of increasing the temperature to a certain temperature by giving heat to the first pipe 202 from the outside and not giving heat thereafter, (2) a method of constantly giving heat to the first pipe 202 from the outside, and otherwise are included. As the method of giving heat to the first pipe 202 from the outside, a method of providing a heating member so as to surround the first pipe 202 (disposing heating member in contact manner so as to surround first pipe 202), a method of blowing hot air to the first pipe 202, and otherwise are included.

Meanwhile, the expression "keeping heat" in the embodiment refers to causing not losing heat without giving heat, that is, making the temperature hard to decrease. Therefore, as the method of adjusting the temperature of the first pipe 202 to fall within the predetermined temperature range by causing the first pipe temperature adjusting portion 71 to keep the heat of the first pipe 202, a method of making temperature hard to decrease by surrounding the first pipe 202 with the heat reserving material (heat insulating material) formed of rock wool is included.

In addition, in the embodiment, the first pipe temperature adjusting portion 71 may be configured so as to adjust the temperature of the first pipe 202 to fall within the predetermined temperature range by heating the first pipe 202 or keeping the heat of the first pipe 202. In this case, while heat of the first pipe 202 is kept by surrounding the first pipe 202 with the heat reserving material, the first pipe 202 is directly heated by actively giving the heat from the outside.

In accordance with the water-absorbent resin production apparatus 500 according to the embodiment, the first pipe temperature adjusting portion 71 adjusts the temperature of the first pipe 202 to fall within the predetermined temperature range such that the gas flowing through the first pipe 202 is not condensed. Therefore, it is possible to suppress the adhesion of the polymer (a polymer resulted from condensation of gas as well as a solidified polymer) to the inner wall surface of the first pipe 202 that comes into contact with the gas discharged from the reactor main body 200A. As a result, in the first pipe 202, it is possible to prevent blocking of the channel through which the gas flows. In addition, since the polymer can be inhibited from being adhered to the inner wall surface of the first pipe 202, the fragment of the adhered product can be prevented from flowing into the reactor main body 200A together with the gas via the first pipe 202, the heat exchanging structure 100, and the second pipe 203. As a result, the homogeneity of the water-absorbent resin created by the polymerization reaction in the reactor main body 200A can be prevented from decreasing.

The polymerization reactor temperature adjusting portion 72 adjusts the temperature of at least the upper portion of the reactor main body 200A to fall within the predetermined temperature range (predetermined temperature range) in which the gas existing in the gaseous phase portion of the reactor main body 200A is not condensed. The polymerization reactor temperature adjusting portion 72 adjusts the temperature of the reactor main body 200A to fall within the predetermined temperature range by heating at least the upper portion of the reactor main body 200A from the outside, or keeping the heat of the reactor main body 200A.

As the method of adjusting the temperature of the reactor main body 200A to fall within the predetermined temperature range by causing the polymerization reactor temperature adjusting portion 72 to heat the reactor main body 200A, and the method of adjusting the temperature of the reactor main body 200A to fall within the predetermined temperature range by causing the polymerization reactor temperature adjusting portion 72 to keep the heat of the reactor main body 200A, the methods which are the same as in the first pipe temperature adjusting portion 71 described above are included.

In accordance with the water-absorbent resin production apparatus 500 according to the embodiment, the polymerization reactor temperature adjusting portion 72 adjusts the temperature of the reactor main body 200A to fall within the predetermined temperature range in which the gas existing in the gaseous phase portion of the reactor main body 200A is not condensed. Therefore, it is possible to inhibit the polymer from being adhered to the inner wall surface with which the gas in the upper portion of the reactor main body 200A comes into contact. As a result, the fragment of the adhered product can be prevented from being mixed into the reactor main body 200A, and thus the homogeneity of the water-absorbent resin created by the polymerization reaction in the reactor main body 200A is prevented from decreasing.

In addition, the temperature range of the first pipe 202 adjusted by the first pipe temperature adjusting portion 71 and the temperature range of the reactor main body 200A adjusted by the polymerization reactor temperature adjusting portion 72 are preferably no less than 30° C. and no more than 150° C., more preferably no less than 40° C. and no more than 90° C., and particularly more preferably no less than 50° C. and no more than 80° C. When the temperature of the first pipe 202 and the reactor main body 200A is less than 30° C., the adherence suppressing effect of the polymer may not be sufficiently exhibited. In addition, when the temperature of the first pipe 202 and the reactor main body 200A exceeds 150° C., the prominent adherence suppressing effect of the polymer is not obtained, compared with a case where the temperature is 150° C. or lower, and when the temperature is caused to be high, an economic advantage may not be obtained.

In addition, the temperature range of the first pipe 202 adjusted by the first pipe temperature adjusting portion 71 and the temperature range of the reactor main body 200A adjusted by the polymerization reactor temperature adjusting portion 72 may be set to fall within the range of (T−20)[° C.] to T[° C.], and particularly in the range of (T−10)[° C.] to T[° C.], in which the temperature of the gas of the gaseous phase portion in the reactor main body 200A is T[° C.]. Accordingly, it is possible to effectively inhibit the polymer from being adhered to the inner wall surfaces of the first pipe 202 and the reactor main body 200A.

In the water-absorbent resin production apparatus 500 according to the embodiment, as described above, the polymerization reaction liquid discharge opening portion 204 for discharging the polymerization reaction liquid R1 that contains the water-containing gel crosslinked polymer R2 from the reactor main body 200A after the end of the polymerization reaction, is provided on the bottom portion of the reactor main body 200A. The polymerization reaction liquid R1 discharged from the reactor main body 200A via the polymerization reaction liquid discharge opening portion 204 flows into the concentrator 300.

The concentrator 300 distills the liquid components from the polymerization reaction liquid R1, and has a concentrator main body 300A which is formed in a container shape. The polymerization reaction liquid R1 is contained in the concentrator main body 300A, the upper portion of which is left for the gaseous phase portion (such that gaseous phase portion is formed in the upper portion), and liquid components are distilled in the concentrator main body 300A. Also, a polymerization reaction liquid inflow opening portion 308, a gas discharge opening portion 309A, and a dispersion medium inflow opening portion 309B are provided on the upper portion of the concentrator main body 300A, and a concentration liquid discharge opening portion 305 is provided on the bottom portion.

A third pipe 205 is connected between the polymerization reaction liquid discharge opening portion 204 of the reactor main body 200A and the polymerization reaction liquid inflow opening portion 308 of the concentrator main body 300A. A third valve 205A that opens and closes the channel in the pipe is provided in the third pipe 205. When the third valve 205A is in an open state, the polymerization reaction liquid R1 that contains the water-containing gel crosslinked polymer R2 discharged from the reactor main body 200A via the polymerization reaction liquid discharge opening portion 204 flows through the third pipe 205 into the concentrator main body 300A via the polymerization reaction liquid inflow opening portion 308.

The concentrator 300 distills liquid components from the polymerization reaction liquid R1 in the concentrator main body 300A. As materials that configure the concentrator 300, copper, titan alloy, and stainless steel such as SUS304, SUS316, and SUS316L are included. However, from the point of view of suppressing adherence of the water-containing gel crosslinked polymer R2, surface processing such as fluororesin processing is preferably performed on the inner wall surface.

The distillation processing of the liquid components from the polymerization reaction liquid R1 in the concentrator 300 may be performed under normal pressure or reduced pressure, and may be performed under air streams of nitrogen, in order to enhance the distillation efficiency of the liquid components. In addition, in the embodiment, a stirring portion 301 is provided in the concentrator main body 300A of the concentrator 300, and distillation processing of the liquid components is performed while the polymerization reaction liquid R1 is stirred by the stirring portion 301.

When the distillation processing by the concentrator 300 is performed under normal pressure, the set temperature of the concentrator main body 300A is preferably in the range of 70 to 250° C., more preferably in the range of 80 to 180° C., and still more preferably in the range of 80 to 140° C., and most preferably in the range of 90 to 130° C. In addition, the distillation processing by the concentrator 300 is performed under reduced pressure, and the set temperature of the concentrator main body 300A is preferably in the range of 60 to 100° C., and more preferably in the range of 70 to 90° C.

In addition, for example, in the distillation processing of the liquid components from the polymerization reaction liquid R1 in the concentrator main body 300A, a post crosslinking agent containing two or more functional groups which have reactivity with the functional groups derived from the water soluble ethylenically unsaturated monomer is preferably added. When the crosslinking agent is added and reacted after the polymerization, the crosslink density of the surface layer of the water-absorbent resin particles increases. Therefore, various performances such as water absorption properties under pressure, water absorption speeds, and gel strength can be caused to increase, and thus performances highly appropriate for sanitary material application are given.

The post crosslinking agent used for the crosslinking reaction is not particularly limited, as long as the post crosslinking agent can react with the functional group derived from water soluble ethylenically unsaturated monomer used in the polymerization.

As the used post crosslinking agent, for example, there are included polyols such as ethylene glycol, propylene glycol, 1,4-butanediol, trimethylolpropane, glycerol, polyoxyethylene glycol, polyoxypropylene glycol and polyglycerol; polyglycidyl compounds such as (poly)ethylene glycol diglycidyl ether, (poly)ethylene glycol triglycidyl ether, (poly)glycerine diglycidyl ether, (poly)glycerin triglycidyl ether, (poly)propylene glycol polyglycidyl ether and (poly)glycerol polyglycidyl ether; haloepoxy compounds such as epichlorohydrin, epibromohydrin and α-methyl epichlorohydrin; compounds having two or more reaction functional groups such as isocyanate compounds such as 2,4-tolylene diisocyanate and hexamethylene diisocyanate; oxetane compounds such as 3-methyl-3-oxetane methanol, 3-ethyl-3-oxetane methanol, 3-butyl-3-oxetane methanol, 3-methyl-3-oxetane ethanol, 3-ethyl-3-oxetane ethanol and 3-butyl-3-oxetane ethanol; an oxazoline compound such as 1,2-ethylene bisoxazoline, and a carbonate compound such as ethylene carbonate. These may be used alone, or two or more thereof may be used in combination.

Among these, from the point of view of excellent reactivity, polyglycidyl compounds such as (poly)ethylene glycol diglycidyl ether, (poly)ethylene glycol triglycidyl ether, (poly)glycerine diglycidyl ether, (poly)glycerin triglycidyl ether, (poly)propylene glycol polyglycidyl ether and (poly)glycerol polyglycidyl ether are preferable.

The added amount of the post crosslinking agent is preferably in the range of 0.01 to 5 parts by mass, and more preferably in the range of 0.02 to 3 parts by mass with respect to the total amount of 100 parts by mass of the polymerized water soluble ethylenically unsaturated monomer. When the added amount of the post crosslinking agent is 0.01 part by mass or greater, various performances of the obtained water-absorbent resin such as the water absorption properties under pressure, water absorption speeds, and gel strength can be increased. When the added amount is 5 parts by mass or lower, the water absorption properties can be inhibited from being too low.

Further, as the adding method of the post crosslinking agent, the post crosslinking agent may be added without change, or may be added in a form of an aqueous solution, but may be added as a solution using a hydrophilic organic solvent as a solvent, if necessary. As the hydrophilic organic solvent, for example, there are included lower alcohols such as methyl alcohol, ethyl alcohol, n-propyl alcohol, isopropyl alcohol and propylene glycol, ketones such as acetone and methyl ethyl ketone, ethers such as diethyl ether, dioxane and tetrahydrofuran, amides such as N,N-dimethylformamide, and sulfoxides such as dimethyl sulfoxide. The hydrophilic organic solvents may be used alone, or two or more thereof may be used in combination.

The addition time of the post crosslinking agent is not particularly limited, as long as the addition time is time after polymerization. In the distillation processing of the liquid components from the polymerization reaction liquid R1 in the concentrator main body 300A of the concentrator 300, the post crosslinking reaction is preferably performed in the presence of moisture in the range of 1 to 200 parts by mass, more preferably performed in the presence of moisture in the range of 5 to 100 parts by mass, and still more preferably performed in the presence of moisture in the range of 10 to 50 parts by mass with respect to 100 parts by mass of the water-absorbent resin. In this manner, when the moisture amount at the time of adding the post crosslinking agent is adjusted, post crosslinking in the surface layer of the particles of the water-absorbent resin can be performed more appropriately, and thus excellent water absorption properties can be exhibited.

The temperature in the post crosslinking reaction is preferably in the range of 50 to 250° C., more preferably in the range of 60 to 180° C., still more preferably in the range of 60 to 140° C., and most preferably in the range of 70 to 120° C.

In addition, when distillation processing by the concentrator 300 is performed under normal pressure, dehydration can be performed by refluxing only the petroleum-based hydrocarbon dispersion medium among liquid components distilled out of the system by azeotropy. As described above, as a configuration for realizing the reflux of the petroleum-based hydrocarbon dispersion medium in the concentrator 300, in the present embodiment, a heat exchanging structure 110 is connected to the concentrator main body 300A via a fourth pipe 302. The fourth pipe 302 is connected to the gas discharge opening portion 309A in the upper portion of the concentrator main body 300A such that one end portion thereof communicates with the gaseous phase portion of the concentrator main body 300A, and the other end portion thereof is connected to the gas inflow opening portion 51 of the heat exchanging structure 110. In addition, a fourth valve 302A that opens and closes the channel in the pipe is provided in the fourth pipe 302. When the fourth valve 302A is in an open state, the gas (vapor of liquid components in the polymerization reaction liquid R1) existing in the gaseous phase portion of the concentrator main body 300A flows through the fourth pipe 302 via the gas discharge opening portion 309A, into the heat exchanging structure 110 via the gas inflow opening portion 51.

The heat exchanging structure 110 cools the gas by heat exchange between the gas heated in the concentrator main body 300A and the heat exchange fluid, and discharges the cooled fluid obtained by the cooling to the outside via the cooled fluid discharge opening portion 52. A fifth pipe 303 is connected between the cooled fluid discharge opening portion 52 and the dispersion medium inflow opening portion 309B of the concentrator main body 300A. In the fifth pipe 303, an oil-water separator 307, and a fifth valve 303A that opens and closes the channel in the pipe are provided. When the fifth valve 303A is in an open state, the petroleum-based hydrocarbon dispersion medium separated from the cooled fluid in the oil-water separator 307 flows through the fifth pipe 303 into the concentrator main body 300A via the dispersion medium inflow opening portion 309B. In addition, a sixth pipe 304 branched from the oil-water separator 307 is provided, and the aqueous solution separated from the cooled fluid by the oil-water separator 307 is collected in a separation recovery unit 401 by opening a sixth valve 304A.

In addition, in the embodiment, the fifth valve 303A provided in the fifth pipe 303 is caused to be in a closed state, by not driving the oil-water separator 307, and the cooled fluid discharged from the cooled fluid discharge opening portion 52 of the heat exchanging structure 110 can be also collected in the separation recovery unit 401. In addition, instead of the collected petroleum-based hydrocarbon dispersion medium, a new petroleum-based hydrocarbon dispersion medium may be added to the concentrator main body 300A.

The concentration liquid discharge opening portion 305 for discharging the concentration liquid of the polymerization reaction liquid R1 obtained by distilling and concentrating a predetermined amount of the liquid components from the concentrator main body 300A after the end of the concentration is provided on the bottom portion of the concentrator main body 300A. The concentration liquid discharged from the concentrator main body 300A via the concentration liquid discharge opening portion 305 flows into the drying machine 400.

A seventh pipe 306 is connected between the concentration liquid discharge opening portion 305 and the drying machine 400. A seventh valve 306A that opens and closes the channel in the pipe is provided in the seventh pipe 306. When the seventh valve 306A is in an open state, the concentration liquid discharged from the concentrator main body 300A via the concentration liquid discharge opening portion 305 flows through the seventh pipe 306 into the drying machine 400.

The drying machine 400 heats the concentration liquid such that the moisture content becomes preferably 20% by mass or lower, and more preferably 10% by mass or lower, so as to obtain the dry water-absorbent resin. In order to enhance various characteristics such as fluidity, various additives such as amorphous siliceous powder may be added to the water-absorbent resin obtained by the drying machine 400. In addition, in the distillation processing, concentration and drying may be directly performed in the drying machine 400, but instead of the distillation processing, the created particles may be separated by decantation, filtration, or a centrifugal separator, and washed and dried.

The problem of adherence of the polymer due to the condensation of the gas is not limited to the inner wall surfaces of the reactor main body 200A and the first pipe 202 connected to the reactor main body 200A of the polymerization reactor 200, but is also generated in the concentrator 300 having the concentrator main body 300A that contains the polymerization reaction liquid R1.

Therefore, with respect to the water-absorbent resin production apparatus 500 according to the embodiment, a temperature adjusting portion configured in the same manner as in the first pipe temperature adjusting portion 71 provided in the first pipe 202 described above is preferably provided in the fourth pipe 302, and the temperature adjusting portion configured in the same manner as in the polymerization reactor temperature adjusting portion 72 provided in the reactor main body 200A is preferably provided in the concentrator main body 300A.

The temperature adjusting portion provided in the fourth pipe 302 (hereinafter, referred to as "fourth pipe temperature adjusting portion") adjusts the temperature of the fourth pipe 302 to fall within the predetermined temperature range determined in advance in which the gas flowing through the fourth pipe 302 is not condensed. The fourth pipe temperature adjusting portion adjusts the temperature of the fourth pipe 302 to fall within the predetermined temperature range by heating the fourth pipe 302 from outside or keeping the heat of the fourth pipe 302.

As the method of adjusting the temperature of the fourth pipe 302 to fall within the predetermined temperature range by causing the fourth pipe temperature adjusting portion to heat the fourth pipe 302 and the method of adjusting the temperature of the fourth pipe 302 to fall within the predetermined temperature range by causing the fourth pipe temperature adjusting portion to keep the heat of the fourth pipe 302, the methods which are the same as in the first pipe temperature adjusting portion 71 described above are included.

In accordance with the water-absorbent resin production apparatus 500 according to the embodiment, the fourth pipe temperature adjusting portion adjusts the temperature of the fourth pipe 302 to fall within the predetermined temperature range in which the gas flowing through the fourth pipe 302 is not condensed. Therefore, the polymer is inhibited from being adhered to the inner wall surface of the fourth pipe 302 that comes into contact with the gas discharged from the concentrator main body 300A. As a result, in the fourth pipe 302, the channel through which the gas flows can be prevented from being blocked. In addition, the polymer is inhibited from being adhered to the inner wall surface of the fourth pipe 302. Therefore, the fragments of the adhered product can be prevented from flowing into the concentrator main body 300A together with the gas, via the fourth pipe 302, the heat exchanging structure 110, and the fifth pipe 303. As a result, the homogeneity of the water-absorbent resin created by concentrating the polymerization reaction liquid R1 contained in the concentrator main body 300A can be prevented from decreasing.

The temperature adjusting portion provided in the concentrator main body 300A (hereinafter, referred to as "concentrator temperature adjusting portion") adjusts the temperature of at least the upper portion of the concentrator main body 300A to fall within the predetermined temperature range determined in advance in which the gas existing in the gaseous phase portion of the concentrator main body 300A is not condensed. The concentrator temperature adjusting portion adjusts the temperature of the concentrator main body 300A to fall within the predetermined temperature range by heating at least the upper portion of the concentrator main body 300A from the outside or keeping the heat of the concentrator main body 300A.

As the method of adjusting the temperature of the concentrator main body 300A to fall within the predetermined temperature range by causing the concentrator temperature adjusting portion to heat the concentrator main body 300A and the method of adjusting the temperature of the concentrator main body 300A to fall within the predetermined temperature range by causing the concentrator temperature adjusting portion to keep the heat of the concentrator main body 300A, the methods which are the same as in the first pipe temperature adjusting portion 71 described above are included.

In accordance with the water-absorbent resin production apparatus 500 according to the embodiment, the concentrator temperature adjusting portion adjusts the temperature of the concentrator main body 300A to fall within the predetermined temperature range in which the gas existing in the gaseous phase portion of the concentrator main body 300A is not condensed. Therefore, the polymer can be inhibited from being adhered to the inner wall surface that comes into contact with the gas in the upper portion of the concentrator main body 300A. As a result, the fragments of the adhered product can be prevented from being mixed into the concentrator main body 300A, and the homogeneity of the water-absorbent resin created by concentrating the polymerization reaction liquid R1 contained in the concentrator main body 300A can be prevented from decreasing.

In addition, the temperature range of the fourth pipe 302 adjusted by the fourth pipe temperature adjusting portion and the temperature range of the concentrator main body 300A adjusted by the concentrator temperature adjusting portion are preferably no less than 30° C. and no more than 150° C., more preferably no less than 40° C. and no more than 90° C., and particularly more preferably no less than 50° C. and no more than 80° C. When the temperatures of the fourth pipe 302 and the concentrator main body 300A are less than 30° C., there is concern that the adherence suppressing effect of the polymer may not be sufficiently exhibited. In addition, when the temperatures of the fourth pipe 302 and the concentrator main body 300A exceeds 150° C., a prominent adherence suppressing effect of the polymer may not be obtained compared with a case where the temperature is 150° C. or lower, and when the temperature is caused to be high, an economic advantage may not be obtained.

In addition, the temperature range of the fourth pipe 302 adjusted by the fourth pipe temperature adjusting portion and the temperature range of the concentrator main body 300A adjusted by the concentrator temperature adjusting portion may be set to fall within the range of $(T-20)[°\ C.]$ to $T[°\ C.]$, and particularly to the range of $(T-10)[°\ C.]$ to $T[°\ C.]$, in which the temperature of the gas of the gaseous phase portion in the concentrator main body 300A is $T[°\ C.]$. Accordingly, the polymer can be effectively inhibited from being adhered to the inner wall surface of the fourth pipe 302 and the concentrator main body 300A.

Figure 2:
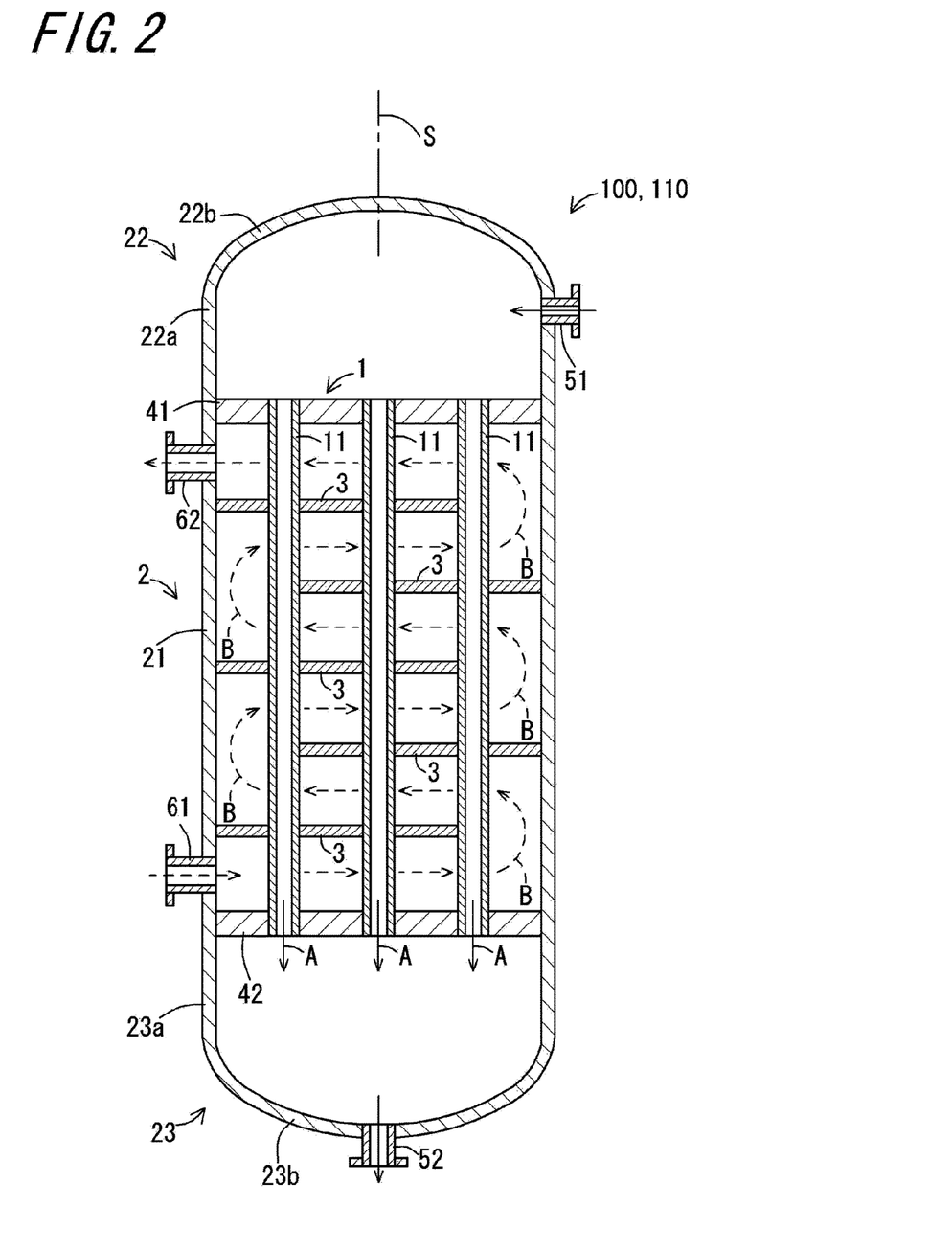
FIG. 2 is a diagram illustrating configurations of heat exchanging structures 100 and 110 provided in a production apparatus 500.

Next, the heat exchanging structures 100 and 110 are described with reference to the drawings. FIG. 2 is a diagram illustrating configurations of the heat exchanging structures 100 and 110 provided in the production apparatus 500.

The heat exchanging structures 100 and 110 are respectively connected to the reactor main body 200A and the concentrator main body 300A in which the polymerization reaction liquid R1 containing the water-absorbent resin which is the polymer of the water soluble ethylenically unsaturated monomer is contained, and cool the gas in the reactor main body 200A and the concentrator main body 300A. Hereinafter, the reactor main body 200A and the concentrator main body 300A in which the polymerization reaction liquid R1 is contained are collectively referred to as "containers".

The heat exchanging structures 100 and 110 include the plural internal pipes 11 which become channels through which the gas discharged from the containers flow and an outer shell 2. The outer shell 2 includes a body portion 21 formed in a tubular shape (cylindrical shape in the embodiment) so as to cover the plural internal pipes 11 from the outside, a first lid portion 22 that extends to one end portion of the body portion 21 in an axial line S direction, and a second lid portion 23 that extends to the other end portion of the body portion 21 in the axial line S direction.

The plural internal pipes 11 are provided to be a tube bundle 1 in the body portion 21. In addition, in the body portion 21, a heat exchange fluid supplying opening portion 61 that forms an opening for supplying the heat exchange fluid that cools the gas by the heat exchange with the gas flowing through the internal pipes 11, into the body portion 21, and a heat exchange fluid discharge opening portion 62 that forms an opening for discharging the heat exchange fluid to the outside. In addition, in the embodiment, the heat exchange fluid supplying opening portion 61 is provided on the other end portion side (side on which the second lid portion 23 is provided) of the body portion 21 in the axial line S direction, and the heat exchange fluid discharge opening portion 62 is provided on one end portion side (side on which the first lid portion 22 is provided) of the body portion 21 in the axial line S direction. In the body portion 21, the heat exchange fluid is caused to flow from the heat exchange fluid supplying opening portion 61 to the heat exchange fluid discharge opening portion 62.

In addition, plural baffle plates 3 are provided in the body portion 21. The baffle plates 3 are configured so as to regularly change the flowing direction of the heat exchange fluid flowing through the body portion 21. The plural baffle plates 3 are provided to be orthogonal to the axial line S with a certain interval in the axial line S direction. Insertion holes are formed in the baffle plates 3, and the internal pipes 11 are inserted through the insertion holes. The heat exchange fluid is guided to the baffle plates 3 and flows through the body portion 21 while changing a flowing direction B so as to meander by providing the baffle plates 3 in the body portion 21, and thus the heat exchange efficiency between the gas flowing through the internal pipes 11 surrounded by the body portion 21 and the heat exchange fluid can be increased.

The first lid portion 22 includes a first peripheral wall portion 22a in a tubular shape (cylindrical shape in the embodiment) which extends to one end portion of the body portion 21 in the axial line S direction and a top plate 22b occupying one end portion of the first peripheral wall portion 22a. The gas inflow opening portion 51 that forms an inflow opening for causing the gas discharged from the containers to flow into the internal pipes 11 via the first lid portion 22 is provided in the first lid portion 22. In the embodiment, the gas inflow opening portion 51 is provided in the first peripheral wall portion 22a of the first lid portion 22.

The second lid portion 23 includes a second peripheral wall portion 23a in a tubular shape (cylindrical shape in the embodiment) which extends to the other end portion of the body portion 21 in the axial line S direction and a bottom plate 23b occupying the one end portion of the second peripheral wall portion 23a. The cooled fluid discharge opening portion 52 which forms a discharging opening causing the cooled fluid created by cooling the gas flowing through the internal pipes 11 to be discharged to the outside via the second lid portion 23 provided in the second lid portion 23. In the embodiment, the cooled fluid discharge opening portion 52 is provided in the bottom plate 23b of the second lid portion 23.

In addition, a first partition wall 41 and a second partition wall 42 are disposed in the outer shell 2. The first partition wall 41 partitions the first lid portion 22 and the body portion 21. The peripheral portion of the first partition wall 41 is fixed to one end portion of the body portion 21 in the axial line S direction. Specifically, the first partition wall 41 is fixed by bonding an outer circumferential surface of the peripheral portion to the inner circumferential surface on one end portion of the body portion 21 in the axial line S direction. In addition, the first partition wall 41 may be fixed by bonding a bottom surface of the peripheral portion to an end surface of one end portion of the body portion 21 in the axial line S direction. Insertion holes through which one end portions of the internal pipes 11 are inserted are formed in the first partition wall 41.

The second partition wall 42 partitions the second lid portion 23 and the body portion 21. The peripheral portion of the second partition wall 42 is fixed to the other end portion of the body portion 21 in the axial line S direction. Specifically, the second partition wall 42 is fixed by bonding the outer circumferential surface of the peripheral portion to the inner circumferential surface of the other end portion of the body portion 21 in the axial line S direction. In addition, the second partition wall 42 may be fixed by bonding the upper surface of the peripheral portion to the end surface of the other end portion of the body portion 21 in the axial line S direction. Insertion holes through which the other end portions of the internal pipes 11 are inserted are formed in the second partition wall 42.

In the heat exchanging structures 100 and 110 according to the embodiment, the gas discharged from the containers flows into a space surrounded by the first lid portion 22 and the first partition wall 41 via the gas inflow opening portion 51 formed in the first lid portion 22. In this manner, the gas flowing into the space surrounded by the first lid portion 22 and the first partition wall 41 flows through the plural internal pipes 11 surrounded by the tubular body portion 21. The gas flowing through the internal pipes 11 is cooled by exchanging heat with the heat exchange fluid flowing through the body portion 21. The cooled fluid obtained by the cooling flows into the space surrounded by the second lid portion 23 and the second partition wall 42. The cooled fluid flowing into the space surrounded by the second lid portion 23 and the second partition wall 42 is discharged to the outside via the cooled fluid discharge opening portion 52 formed in the second lid portion 23. In this manner, the heat exchanging structures 100 and 110 can cool the gas discharged from the containers.

EXAMPLES

Hereinafter, the invention is described in detail by presenting examples of the invention, but the invention is not limited to the examples described below.

Example 1

The water-absorbent resin was produced by the inversion phase suspension polymerization method using the production apparatus 500 illustrated in FIG. 1. In the production of the water-absorbent resin in Example 1, two-stage polymerization reaction was performed on the water soluble ethylenically unsaturated monomer in the petroleum-based hydrocarbon dispersion medium in the presence of dispersion stabilizer by using radical polymerization initiator, by the inversion phase suspension polymerization method.

The heat exchanging structure 100 was connected to the reactor main body 200A of the polymerization reactor 200 via the first pipe 202, the heat reserving material (rock wool, thickness: 40 mm) was provided on the upper portion of the reactor main body 200A and the first pipe 202 with which the gas in the reactor main body 200A came into contact. The heat reserving material functions as the first pipe temperature adjusting portion 71 and the polymerization reactor temperature adjusting portion 72.

In addition, the heat exchanging structure 110 was connected to the concentrator main body 300A of the concentrator 300 via the fourth pipe 302, and the heat reserving material (rock wool, thickness: 40 mm) was provided on the upper portion of the concentrator main body 300A and the fourth pipe 302 with which the gas in the concentrator main body 300A came into contact. The heat reserving material functions as the fourth pipe temperature adjusting portion and the concentrator temperature adjusting portion.

At the time of the polymerization on the first stage, 9000 kg of n-heptane maintained to the temperature of 25° C. as the petroleum-based hydrocarbon dispersion medium and 351 kg of polyglyceryl fatty acid ester (Product Name: Sunsoft Q-1855, manufactured by Taiyo Kagaku Co., Ltd.) of 10% by mass of the n-heptane solution, as the dispersion stabilizer were introduced to the reactor main body 200A.

Subsequently, while inside of the reactor main body 200A was stirred by the stirring portion 201, the contents in the reactor main body 200A was heated to 90° C., so as to dissolve the dispersion stabilizer. Subsequently, the contents in the reactor main body 200A were cooled to 50° C.

Meanwhile, in another container, 3505 kg of the aqueous solution of 80% by mass of acrylic acid was added as the water soluble ethylenically unsaturated monomer, while being cooled, 3890 kg of the aqueous solution of 30% by mass of sodium hydroxide was dripped as the alkaline neutraling agent, and thus neutralization was performed such that the neutralization degree became 75% by mol of the acid group of the water soluble ethylenically unsaturated monomer. Subsequently, 3.5 kg of potassium persulfate as the radical polymerization initiator, 0.7 kg of N,N'-methylenebisacrylamide as the crosslinking agent, and 1908 kg of water were added and dissolved, so as to prepare the aqueous solution of the monomer for polymerization on the first stage.

The total amount of the aqueous solution of the monomer for the polymerization on the first stage which is prepared in another container as described above and is maintained to the temperature of 10° C. was added to the reactor main body 200A, the temperature of the contents of the reactor main body 200A was set to be 30° C., and the substitution with nitrogen was sufficiently performed in the system.

Subsequently, while inside of the reactor main body 200A was stirred by the stirring portion 201, the contents in the reactor main body 200A were heated to become 55° C., and polymerization was initiated. After the initiation of polymerization, the temperature of the contents of the reactor main body 200A increased by the polymerization heat, polymerization was performed for 30 minutes at 80° C. from the time point in which the contents reached 80° C., cooling was performed until the contents in the reactor main body 200A become 13° C., and thus the reaction mixture on the first stage was obtained.

Meanwhile, in another container, the aqueous solution of the monomer for the polymerization on the second stage was prepared. Specifically, in another container, 3505 kg of the aqueous solution of the 80% by mass of acrylic acid was added as the water soluble ethylenically unsaturated monomer, while being cooled, 3890 kg of the aqueous solution of 30% by mass of sodium hydroxide was dripped as the alkaline neutralizing agent, and thus neutralization was performed such that the neutralization degree became 75% by mol of the acid group of the water soluble ethylenically unsaturated monomer. Subsequently, 3.5 kg of potassium persulfate as the radical polymerization initiator, 0.7 kg of N,N'-methylenebisacrylamide as the crosslinking agent, and 1908 kg of water were added and dissolved, so as to prepare the aqueous solution of the monomer for polymerization on the second stage.

The total amount of the aqueous solution of the monomer for the polymerization on the second stage which was prepared in another container as described above and was maintained to the temperature of 13° C. was introduced to the reactor main body 200A containing the reaction mixture on the first stage, and the substitution with nitrogen was sufficiently performed in the system.

While the inside of the reactor main body 200A was stirred by the stirring portion 201, the contents in the reactor main body 200A were heated to become 55° C., and polymerization was initiated. After the initiation of polymerization, the temperature of the contents of the reactor main body 200A increased by the polymerization heat, polymerization was performed for 30 minutes at 80° C. from the time point in which the contents reached 80° C., and thus the reaction mixture on the second stage was obtained.

The reaction mixture on the second stage was transferred to the concentrator main body 300A, while the inside of the concentrator main body 300A was stirred by the stirring portion 301, the contents in the concentrator main body 300A was heated to become 90° C., n-heptane and water were separated by azeotropic distillation between n-heptane and water, n-heptane was returned to the concentrator main body 300A, and thus 7431 kg of water was extracted to the outside of the system. Subsequently, 2.8 kg of N,N'-methylenebisacrylamide was added as the crosslinking agent, the contents in the concentrator main body 300A were reacted at 90° C., and thus the surface-crosslinked reaction mixture was obtained.

The surface-crosslinked reaction mixture was transferred to the drying machine 400, and further heated, such that a predetermined amount of water and n-heptane were extracted to the outside of the system, the dry water-absorbent resin was sieved by a sieve with 850 μm of a sieve opening, and thus 7567 kg of a reformed water-absorbent resin of Example 1 was obtained.

In Example 1 for producing the water-absorbent resin as described above, a water-absorbent resin having an improper particle diameter which was the not-passing object for the sieve having 850 μm of a sieve opening did not exist, and the generation rate of the water-absorbent resin having the improper particle diameter was 0%. As described above, the reason why the generation rate of the water-absorbent resin having the improper particle diameter was able to be decreased is that the heat reserving material was provided on the first pipe 202 with which the gas in the reactor main body 200A came into contact, the upper portion of the reactor main body 200A, the fourth pipe 302 with which the gas in the concentrator main body 300A came into contact, the upper portion of the concentrator main body 300A, and therefore the polymer was inhibited from being adhered to inner wall surfaces of the first pipe 202, the reactor main body 200A, the fourth pipe 302, and the concentrator main body 300A, and as a result, the fragments of the adhered products were inhibited from flowing into the reactor main body 200A and the concentrator main body 300A.

Comparative Example 1

The water-absorbent resin of Comparative Example 1 was obtained in the same manner as in Example 1, except for not providing the heat reserving material on the first pipe 202, the upper portion of the reactor main body 200A, the fourth pipe 302, and the upper portion of the concentrator main body 300A.

In Comparative Example 1, a water-absorbent resin having an improper particle diameter which was the not-passing object for the sieve having 850 μm of a sieve opening existed, and the generation rate of the water-absorbent resin having the improper particle diameter was 7.7%.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description and all changes which come within the meaning and the range of equivalency of the claims are therefore intended to be embraced therein.

REFERENCE SIGNS LIST

1: Tube bundle
2: Outer shell
3: Baffle plate
11: Internal pipe
21: Body portion
22: First lid portion
23: Second lid portion
41: First partition wall
42: Second partition wall
51: Gas inflow opening portion
52: Cooled fluid discharge opening portion
61: Heat exchange fluid supplying opening portion
62: Heat exchange fluid discharge opening portion
71: First pipe temperature adjusting portion
72: Polymerization reactor temperature adjusting portion
100, 110: Heat exchanging structure
200: Polymerization reactor
200A: Reactor main body
201, 301: Stirring portion
202: First pipe
202A: First valve
203: Second pipe
203A: Second valve
204: Polymerization reaction liquid discharge opening portion
205: Third pipe
205A: Third valve
206A, 309A: Gas discharge opening portion
206B: Cooled fluid inflow opening portion
300: Concentrator
300A: Concentrator main body
302: Fourth pipe
302A: Fourth valve
303: Fifth pipe
303A: Fifth valve
304: Sixth pipe
304A: Sixth valve
305: Concentration liquid discharge opening portion
306: Seventh pipe
306A: Seventh valve
307: Oil-water separator
308: Polymerization reaction liquid inflow opening portion
309B: Dispersion medium inflow opening portion
400: Drying machine
401: Separation recovery unit
500: Production apparatus

The invention claimed is:

1. An apparatus for producing a water-absorbent resin, comprising:
a polymerization reactor in which a polymerization product is produced by polymerization reaction of a water soluble ethylenically unsaturated monomer in a liquid medium, the polymerization reactor including
a reactor main body in which the water soluble ethylenically unsaturated monomer and the liquid medium with the polymerization product suspended in the liquid medium is contained and a reactor main body upper portion of which is left for a gaseous phase portion within the polymerization reactor,
a reactor main body gas discharging portion which is connected to the reactor main body and discharges gas of the gaseous phase portion from the reactor main body; and
a reactor main body liquid discharging portion which is connected to the reactor main body and discharges a portion of the liquid medium and suspended polymerization product from the reactor main body;
a first channel portion having a first channel which is connected to the reactor main body gas discharging portion and through which the gas discharged from the reactor main body by the reactor main body gas discharging portion flows;
a first channel portion temperature adjusting portion which adjusts a temperature of the first channel portion to fall within a predetermined temperature range in which the gas flowing through the first channel of the first channel portion is not condensed;
a first cooler which cools the gas of the gaseous phase portion from the reactor main body, the first cooler including
a first cooler main body which is connected to the first channel portion, into which the gas flowing through the first channel of the first channel portion flows, and which cools inflow gas, and
a first cooled fluid discharging portion which is connected to the first cooler main body and discharges a first cooled fluid obtained by cooling the inflow gas in the first cooler main body, from the first cooler main body;
a second channel portion which is connected to the first cooled fluid discharging portion and has a second channel through which the first cooled fluid discharged from the first cooler main body by the first cooled fluid discharging portion flows toward the reactor main body;
a polymerization reactor temperature adjusting portion which adjusts a temperature of the reactor main body to fall within a predetermined temperature range in which the gas of the gaseous phase portion in the reactor main body is not condensed;
a third channel portion which is connected to the reactor main body liquid discharging portion and has a third channel through which the liquid discharged from the reactor main body by the reactor main body liquid discharging portion flows;
a concentrator which concentrates the polymerization product, the concentrator including
a concentrator main body in which the liquid medium with the polymerization product suspended in the liquid medium is contained and a concentrator main body upper portion of which is left for a gaseous phase portion within the concentrator; and
a liquid inflow portion which is connected to the concentrator main body and the third channel and receives the liquid medium with the polymerization product suspended in the liquid medium into the concentrator main body; and
a concentrator adjusting portion which adjusts a temperature of the concentrator main body upper portion to fall within a predetermined temperature range in which gas of the gaseous phase portion within the concentrator is not condensed.

2. The apparatus for producing a water-absorbent resin according to claim 1,
wherein a temperature range of the first channel portion adjusted by the first channel portion temperature adjusting portion and a temperature range of the reactor main body adjusted by the polymerization reactor temperature adjusting portion are no less than 30° C. and no more than 150° C.

3. The apparatus for producing a water-absorbent resin according to claim 1,
wherein a temperature range of the first channel portion adjusted by the first channel portion temperature adjusting portion and a temperature range of the reactor main body adjusted by the polymerization reactor temperature adjusting portion fall within a range of $(T-20)[° C.]$ to $T[° C.]$, in which a temperature of the gas of the gaseous phase portion in the reactor main body is $T[° C.]$.

4. The apparatus for producing a water-absorbent resin according to claim 1, wherein the concentrator further includes a concentrator main body gas discharging portion which is connected to the concentrator main body and discharges a portion the gas of the gaseous phase portion from the concentrator main body.

5. The apparatus for producing a water-absorbent resin according to claim 4, further comprising:
a fourth channel portion having a fourth channel which is connected to the concentrator main body gas discharging portion and through which the gas discharged from the concentrator main body by the concentrator gas discharging portion flows;
a second cooler which cools the gas of the gaseous phase portion from the concentrator main body to form a second cooled fluid; and
a fifth channel portion which is connected to the second cooler and has a fifth channel through which the second cooled fluid discharged from the second cooler flows toward the concentrator main body.

6. The apparatus for producing a water-absorbent resin according to claim 5, further comprising a fourth channel portion temperature adjusting portion which adjusts a temperature of the fourth channel portion to fall within a predetermined temperature range in which the gas flowing through the fourth channel of the fourth channel portion is not condensed.

7. A method for producing a water-absorbent resin, the method comprising:
polymerizing, in a polymerization reactor, water soluble ethylenically unsaturated monomers in a liquid medium to form a polymerization product suspended in the liquid medium, the polymerization reactor including:
a reactor main body in which the water soluble ethylenically unsaturated monomer and the liquid medium with the polymerization product suspended in the liquid medium is contained and an upper portion of which is left for a gaseous phase portion,
a reactor main body gas discharging portion which is connected to the reactor main body and discharges gas of the gaseous phase portion from the reactor main body; and
a reactor main body liquid discharging portion which is connected to the reactor main body and discharges a portion of the liquid medium and suspended polymerization product from the reactor main body;
discharging a portion of the gas from the reactor main body through a first channel portion having a first channel which is connected to the reactor main body gas discharging portion of the reactor main body;
adjusting, via a first channel portion temperature adjusting portion, a temperature within the first channel portion to fall within a predetermined temperature range such that the gas flowing through the first channel of the first channel portion is not condensed;
cooling the portion of the gas from the reactor main body in a first cooler, the first cooler including:
a first cooler main body which is connected to the first channel portion, into which the gas flowing through the first channel of the first channel portion flows, and which cools inflow gas, and
a first cooled fluid discharging portion which is connected to the first cooler main body and discharges a cooled fluid obtained by cooling the inflow gas in the first cooler main body;
communicating the cooled fluid from the first cooler main body to the reactor main body through a second channel portion which is connected to the first cooled fluid discharging portion and has a second channel;
adjusting a temperature of the reactor main body to fall within a predetermined temperature range in which the gas of the gaseous phase portion in the reactor main body is not condensed via a polymerization reactor temperature adjusting portion;
discharging a portion of the liquid medium and suspended polymerization product though a third channel portion which is connected to the reactor main body liquid discharging portion and has a third channel;
concentrating the polymerization product in a concentrator, the concentrator including
a concentrator main body in which the liquid medium with the polymerization product suspended in the liquid medium is contained and a concentrator main body upper portion of which is left for a gaseous phase portion within the concentrator; and
a liquid inflow portion which is connected to the concentrator main body and the third channel and receives the liquid medium with the polymerization product suspended in the liquid medium into the concentrator main body; and
adjusting, via a concentrator adjusting portion, a temperature of the concentrator main body upper portion to fall within a predetermined temperature range in which gas of the gaseous phase portion within the concentrator is not condensed.

8. The method for producing a water-absorbent resin according to claim 7,
wherein the predetermined temperature range to which the first channel portion is adjusted by the first channel portion temperature adjusting portion and the predetermined temperature range to which the reactor main body is adjusted by the polymerization reactor temperature adjusting portion are no less than 30° C. and no more than 150° C.

9. The method for producing a water-absorbent resin according to claim 7,
wherein the predetermined temperature range to which the first channel portion is adjusted by the first channel portion temperature adjusting portion and the predetermined temperature range to which the reactor main body is adjusted by the polymerization reactor temperature adjusting portion fall within a range of $(T-20)[° C.]$ to $T[° C.]$, in which a temperature of the gas of the gaseous phase portion in the reactor main body is $T[° C.]$.

10. The method for producing a water-absorbent resin according to claim 7, further comprising discharging a portion the gas of the gaseous phase portion from the concentrator main body via a concentrator main body gas discharging portion which is connected to the concentrator main body.

11. The method for producing a water-absorbent resin according to claim 10, further comprising:
discharging a portion of the gaseous phase portion from the concentrator main body through a fourth channel portion having a fourth channel which is connected to the concentrator main body gas;
cooling, via a second cooler, the gas of the gaseous phase portion from the concentrator main body to form a heat-exchanged fluid; and
communicating the heat-exchanged fluid discharged from the second cooler toward the concentrator main body via a fifth channel portion which is connected to the second cooler and has a fifth channel.

12. The method for producing a water-absorbent resin according to claim 11, further comprising adjusting, via a fourth channel portion temperature adjusting portion, a temperature of the fourth channel portion to fall within a predetermined temperature range in which the gas flowing through the fourth channel of the fourth channel portion is not condensed.

* * * * *